US009266533B2

(12) United States Patent
Zhao

(10) Patent No.: US 9,266,533 B2
(45) Date of Patent: Feb. 23, 2016

(54) ADAPTIVE CRUISE CONTROL SYSTEM AND METHOD FOR VEHICLE

(75) Inventor: Dongbin Zhao, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 204 days.

(21) Appl. No.: 13/976,614

(22) PCT Filed: Dec. 30, 2010

(86) PCT No.: PCT/CN2010/002208
§ 371 (c)(1),
(2), (4) Date: Sep. 16, 2013

(87) PCT Pub. No.: WO2012/088635
PCT Pub. Date: Jul. 5, 2012

(65) Prior Publication Data
US 2014/0012479 A1 Jan. 9, 2014

(51) Int. Cl.
*B60W 30/14* (2006.01)
*B60K 31/00* (2006.01)
*B60W 10/06* (2006.01)
(Continued)

(52) U.S. Cl.
CPC .......... *B60W 30/143* (2013.01); *B60K 31/0008* (2013.01); *B60W 10/04* (2013.01); *B60W 10/06* (2013.01); *B60W 10/184* (2013.01); *B60W 30/16* (2013.01); *B60W 2050/0062* (2013.01); *B60W 2600/00* (2013.01)

(58) Field of Classification Search
None
See application file for complete search history.

(56) References Cited

U.S. PATENT DOCUMENTS 5,710,565 A * 1/1998 Shirai ................... B60W 30/16
340/903
7,945,369 B2 5/2011 Lindqvist et al.
(Continued)

FOREIGN PATENT DOCUMENTS

| CN | 101326074 A | 12/2008 |
| JP | 2009248683 A | 10/2009 |
| WO | 2010116499 A1 | 10/2010 |

OTHER PUBLICATIONS

Broggi A. et al., "Intelligent Vehicles", Springer Handbook of Robotics, Berlin Heidelberg 2008, pp. 1175-1198.
(Continued)

*Primary Examiner* — Rami Khatib
*Assistant Examiner* — David Merlino
(74) *Attorney, Agent, or Firm* — Seed IP Law Group PLLC

(57) ABSTRACT

A vehicle adaptive cruise control system and method are provided. The adaptive cruise control system, comprising an adaptive cruise mode selection unit configured to select adaptive cruise modes to control speeds and relative distances for a host vehicle in different modes; a data acquisition unit configured to acquire a vehicle state variable x(t); a control unit configured to generate a vehicle control signal u(t) based on the vehicle state variable x(t); a critic unit configured to evaluate a control performance according to the vehicle state variable x(t) and the vehicle control signal u(t), if a result of evaluation indicates that the control performance does not comply with a requirement, then the control unit and the critic unit perform an online leaning; a gas pedal unit and a brake unit configured to be controlled respectively by using the vehicle control signal u(t) output from the is control unit and data provided from a the vehicle inverse dynamics. According to the system, the safety and personality is improved.

10 Claims, 4 Drawing Sheets

(51) Int. Cl.
  *B60W 10/184* (2012.01)
  *B60W 30/16* (2012.01)
  *B60W 10/04* (2006.01)
  *B60W 50/00* (2006.01)

(56) References Cited

U.S. PATENT DOCUMENTS

| | | | |
|---|---|---|---|
| 2001/0032048 A1 | 10/2001 | Hellmann et al. | |
| 2005/0143894 A1* | 6/2005 | Wagner | B60W 30/16 701/93 |
| 2005/0201590 A1* | 9/2005 | Kudo | 382/103 |
| 2006/0279137 A1* | 12/2006 | Steen | B60W 30/16 701/91 |
| 2008/0167820 A1* | 7/2008 | Oguchi et al. | 701/301 |
| 2008/0272898 A1* | 11/2008 | Irion | B60W 30/16 340/436 |
| 2009/0234552 A1* | 9/2009 | Takeda et al. | 701/96 |
| 2009/0254260 A1 | 10/2009 | Nix et al. | |
| 2009/0321165 A1 | 12/2009 | Haug | |
| 2011/0093177 A1* | 4/2011 | Horn | B60W 30/16 701/70 |
| 2011/0276246 A1* | 11/2011 | Kuze | B60W 30/16 701/96 |
| 2012/0065863 A1* | 3/2012 | Takagi | B60W 30/16 701/96 |

OTHER PUBLICATIONS

Zhimei G., "Stop & Go Cruise Control Based on Laser Radar," Shanghai Jiaotong University Master Thesis, 2009, 79 pages.
Kesting A. et al., "Adaptive cruise control design for active congestion avoidance," Transportation Research Part C 16, 2008, 668-683.
Rajaonah B. et al., "Trust and the use of adaptive cruise control: a study of a cut-in situation," Cognitive Technology Work, 2006, 8: 146-155.

* cited by examiner

ADAPTIVE CRUISE CONTROL SYSTEM AND METHOD FOR VEHICLE

TECHNICAL FIELD

The present invention relates to vehicle cruise control fields, especially to a vehicle adaptive cruise control system and method

BACKGROUND

Vehicle adaptive cruise control (ACC) is an advanced driver assistance system (ADAS). The ACC system is a development version of a cruise control (CC) system. In the ACC system, controlling parameters for a throttle or a breaking are calculated by measuring a distance from a host vehicle to a target vehicle and a relative speed to the target vehicle and a vehicle control or a distance control is implemented by adaptive adjustment. With the ACC system, a driver may drive the vehicle easier and a collision control may be achieved so as to improve safety, comfort and low cost for the vehicle driving.

Regarding to the safety, according to statistics of World Health Organization, (Broggi A., Zelinsky A., Parent M., Thorpe C. E. Intelligent vehicles, In Spring Handbooks of Robotics, Siciliano B., Khatib O. (Eds.), Springer-Verlag Berlin Heidelberg 2008, pp. 1175-1198.), there are about 1.2 million died and 5000 wound in the traffic accident in the whole world. Among which 90% are caused by drivers' fault, including fatigue, drunk, speeding, and so on. An average response time of normal drivers to emergency is about 1 second, while the response time of vehicle ACC is rather less. Therefore, the ACC is effective to avoid most traffic accidents with ACC.

Regarding to the comfort, traffic jams often occur in urban city, so that drivers should frequently stop and go, which needs lots of pedal switching activities, about 20-30 feet and hands coordination per minute. (Zhimei Gan. Stop&Go Cruise Control Based on Laser Radar. Shanghai Jiaotong University Master Thesis, 2009.) This is a main reason of driving fatigue. ACC can liberate the driver from frequent speeding up and slowing down and reduce the drivers' mental stress. Drivers can really enjoy the driving process.

Regarding to the low cost, recently low energy cost and low carbon emission are advocated. As well known, most waste emission is released during low speed driving, and ACC provides an optimized economic driving mode. On the other hand, a proper distance may be kept between the vehicles provided with the ACC system so as to improve a passage capacity and alleviate traffic jam. It is demonstrated that if a quarter vehicles were equipped with the ACC system in highways, the congestion would be effectively avoided. (Kesting A., Treiber M., Schonhof M., Helbing D. Adaptive cruise control design for active congestion avoidance. Transportation Research Part C, 2008, 16: 668-683.).

However, different drivers have different driving habits. This puts forward a high requirement for the ACC controller design. Otherwise, the driver may prefer to cancel the ACC function. Details are discussed in (Rajaonah B., Anceaux F., Vienne F. Trust and the use of adaptive cruise control: a study of a cut-in situation. Cognitive Technology Work, 2006, 8: 146-155.).

In general, there are some advantages in a conventional ACC system. However, when controlling the speed and the relative distance, the conventional ACC system can't perform adaptive adjustment based on different driving habits under various driving scenarios to improve the driver experience.

Therefore it is needed to provide an improved ACC system to address the advantages mentioned above.

SUMMARY

In order to solve the above technical problems in the prior art, the present invention provides an adaptive cruise control system and method.

An adaptive cruise control system according to the present invention may include: an adaptive cruise mode selection unit configured to select an adaptive cruise modes to control speeds and relative distances for a host vehicle in different modes; a data acquisition unit configured to acquire a vehicle state variable $x(t)$; a control unit configured to generate a vehicle control signal $u(t)$ based on the vehicle state variable $x(t)$; a critic unit configured to evaluate a control performance according to the vehicle state variable $x(t)$ and the vehicle control signal $u(t)$, if a result of evaluation indicates that the control performance does not comply with a requirement, then the control unit and the critic unit perform an online leaning; a gas pedal unit and a brake unit configured to be controlled respectively by using the vehicle control signal $u(t)$ output from the control unit and data provided from a the vehicle inverse dynamics.

An adaptive cruise control method according to the present invention may comprise steps of: selecting an adaptive cruise mode to control speeds and relative distances for a host vehicle; acquiring a vehicle state variable $x(t)$, as an input to a control unit; generating, by the control unit, a vehicle control signal $u(t)$ based on the vehicle state variable $x(t)$; evaluating, by a critic unit, a control performance according to the vehicle state variable $x(t)$ and the vehicle control signal $u(t)$, if a result of evaluation indicates that the control performance does not comply with a requirement, then performing, by the control unit and the critic unit, an online leaning; if the results of evaluation indicates that the control performance complies with the requirement, controlling a gas pedal unit and a breaking unit respectively by using the vehicle control signal $u(t)$ and data provided from a vehicle dynamics inverse model.

The adaptive cruise control system and method according to the present invention propose an effective human-like driving constructor by a hybrid offline simulation and online experiment. The adaptive cruise control system and method have a learning and optimization property. By the offline and online learning of driving behavior, the system can imitate the habits of the driver. The critic unit is used to guide the learning of the control unit by tracing the change of the driving behavior.

DETAILED DESCRIPTION OF THE EMBODIMENTS

Hereinafter, exemplary embodiments will be described in greater detail with reference to the accompanying drawings.

It should be noted that the exemplary embodiments are merely exemplary and are not to be construed as limiting the present inventive concept.

An ACC system may control the vehicle with a range sensor (proximity radar or laser radar) to measure the relative distance and the relative speed between the host vehicle and the target vehicle in the same lane in real time and calculate a control amount for operating the brake or the gas pedal base on the speed of the host vehicle to automatically keep a safe relative distance and relative speed.

Conventionally, a control structure of the ACC system can be classified into two categories: a direct control and a hierarchical control. The direct control uses an integrated controller to directly control the gas pedal and brake to regulate the relative speed and distance. The hierarchical control may implement the control in an upper level and a bottom level. An upper controller controls the vehicle speed or relative distance by calculating a desired acceleration control signal according to a current driving profile. A bottom controller controls the desired acceleration by adjusting the brake and the throttle control variable based on the vehicle dynamics. That is, the upper controller focuses on the driving behavior under different driving scenarios, while the bottom controller is generally implemented with an inverse vehicle dynamics.

Figure 1:
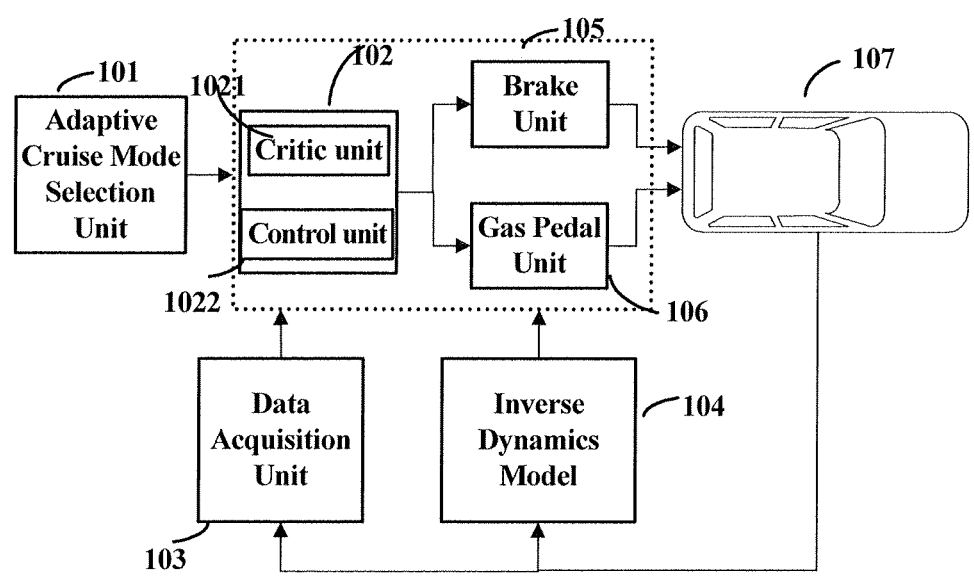
FIG. 1 shows a block diagram of an adaptive cruise control system according to the present invention.

The adaptive cruise control system according to the embodiment provides an advanced upper controller as shown in FIG. 1. The system may include: an adaptive cruise mode selection unit 101; an automatic cruise control unit 102; a data acquisition unit 103; a vehicular inverse dynamics model generating unit 104; a brake control unit 105; and a gas pedal unit 106.

Adaptive cruise mode selection unit 101 is used for a driver to select different adaptive cruise modes based on its driving habit.

The driving habit differs a lot from a career, character, age, gender, etc. For example, a taxi driver differs a lot to a new driver, and a younger differs a lot to an elder. Therefore, the adaptive cruise control method according to the embodiment shall provide a driver assistant system for different driving habits so as to be accepted.

The adaptive cruise modes according to the embodiment may comprise a safety mode, an agility mode and a comfort mode and different control performance index may be set for the respective modes.

The safety mode represents the driving habit with low driving speed and keeping long distance to the target one both in a motion and/or a stationary state. If another vehicle wants to cut in, it typically slows down to make enough room for the cut-in. The driving mode is suitable for conservative drivers to ensure the maximum safety.

The agility mode represents the driving habit with the maximum high speed and keeping short distance to the target vehicle both in the motion and/or the stationary state. If another vehicle wants to cut in, it typically speeds up to reduce the room to avoid the cut-in. The agility driving mode is suitable for taxi drivers or skilled younger drivers, for example, or adopted when there is an emergency.

The comfort mode is a mode between the safety and agility modes. In this mode, the driving speed and distance to the target vehicle are normal. If another vehicle wants to cut in, it will make a decision of speeding up or slowing down according to a specific circumstance.

The adaptive cruise mode selection unit 101 can be implemented with a button, a menu, a joy sticker, a touch screen or a remote controller, etc.

In the prior art, there have been lots of researches on the driving habit based on the sensed driving data. The driving habit can be simplified denoted by $$d_d(t) = d_0 + \tau v^T(t)$$

where $d_0$ is a zero-speed clearance between the two vehicles, $d_d(t)$ is a desired distance between the vehicles, $v^T(t)$ is an instant speed of the target vehicle, and $\tau$ is a linear index related to the different driving habits.

The larger zero-speed clearance $d_0$ and the index $\tau$ correspond to a mode for conservative drivers which may select the safety mode. The middle $d_0$ and $\tau$ may correspond to a mode for normal drivers which may select the comfort mode and the lower $d_0$ and $\tau$ may correspond to a mode for sportive drivers which may select the agility mode. For example, $\tau<1$ is set for the agility mode, $\tau>4$ is set for the safety mode, and $1 \leq \tau \leq 4$ is set for the comfort mode. The driver can is select a preferred range for the driving mode according to his driving habit.

The automatic cruise control unit 102 is used to compute the desired acceleration according to the driving mode selected by the adaptive cruise mode selection unit 101 and the data obtained by data acquisition unit 103. Thereafter, the acceleration computed is input to the vehicular inverse dynamics model generating unit 104 to derive control signals for the gas pedal and the brake, and then forwarded to the brake unit 105 or the gas pedal unit 106.

The automatic cruise control unit 102 may include a critic unit 1021 and a control unit 1022.

The critic unit 1021 is used to evaluate a performance index R(t) for the control unit 1022 so as to guide an optimization process of the control unit 1022.

The performance index R(t) is defined as a sum of instant rewards r(t) at each moments, to guide the optimization process of the control unit 1022, $$R(t) = \sum_{k=t+1}^{\infty} \gamma^{k-t-1} r(k)$$

where r(t) is the instant reward at time t, $\gamma$ is a discount factor, $0<\gamma \leq 1$, and k is an variable to represent a scope of time t.

The reward r(t) can be defined as a quadratic form, $$r(t) = -(x(t)^T Q x(t) + u(t)^T R u(t)) = -(\rho_d \Delta d(t)^2 + \rho_v \Delta v(t)^2 + \rho_a a(t)^2)$$

where $\rho_d$, $\rho_v$ and $\rho_a$ are weights of the relative distance, the relative speed and the acceleration respectively, and to be selected according to the different driving to habits. Q and R are weights which may be replaced with $\rho_d$, $\rho_v$ and $\rho_a$. The relative distance $\Delta d(t) = d(t) - d_d(t)$, is defined as a difference between an actual distance d(t) and the desired distance $d_d(t)$. The relative speed $\Delta v(t) = v^T(t) - v^H(t)$, is defined as a difference between the speed of the target vehicle $v^T(t)$ and the speed of the host vehicle $v^H(t)$. Thus, the optimal control objective is to perform control to maximize the performance index R(t).

However, it will cause a curse of dimensionality because of the calculation of the future rewards. Thus an approximated performance index J(t) is calculated according to the embodiment.

Different adaptive cruise modes will lead to different approximated performance index J(t).

The critic unit 1021 may be trained offline first, and then optimized online.

The offline training of critic unit 1021 is typically implemented before using the automatic cruise control system. In the offline training process, a 3D simulator is constructed to capture the data of different drivers under various driving scenarios, which are taken as training data for control unit 1022 and critic unit 1021. The 3D simulator is developed based on the vehicular dynamics and 3D animation software, to emulate the actual driving circumstance for the adaptive cruise control.

Figure 2:
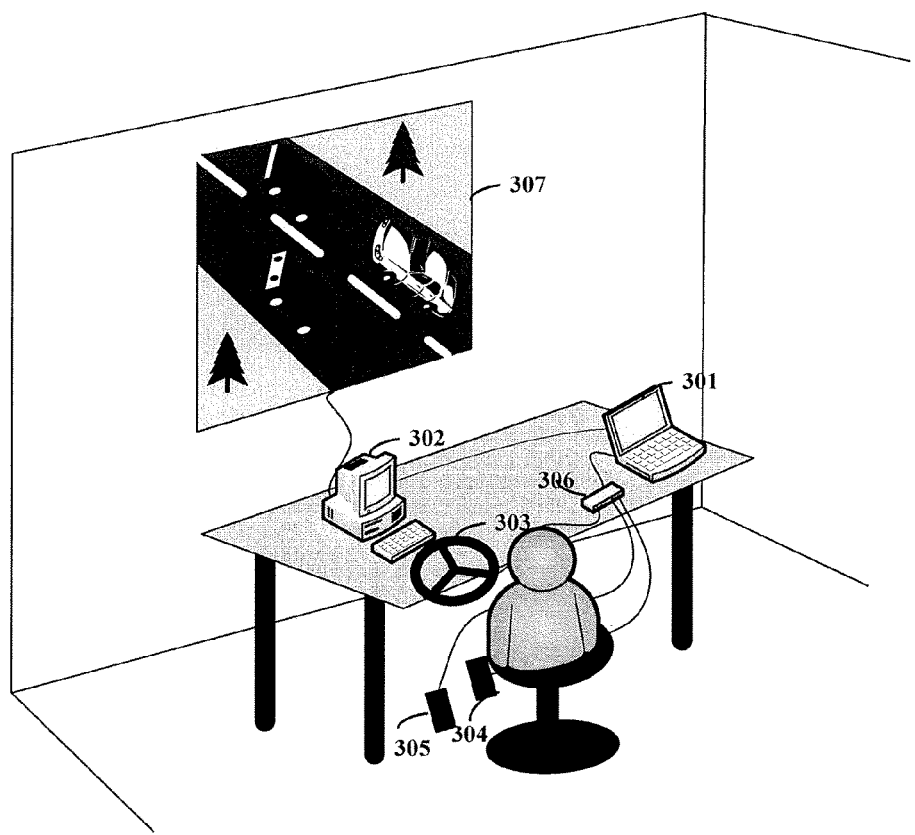
FIG. 2 shows a 3D driving simulator schematically according to the present invention.

FIG. 2 shows the scheme of the 3D driving simulator, which includes a 3D simulation computer 301, an animation display computer 302, a driving wheel 303, a gas pedal 304, a brake 305, a data interface 306, and a display 308.

In the 3D simulation computer 301, a virtual reality toolbox of the VC++, Matlab or JAVA software is used to build the 3D model of the vehicles and the environment, set the parameters of the 3D simulation, and execute the 3D simulation with an animation engine. In the case of the Matlab software, an xPC target function is used to output a 3D simulation result to the animation display computer 302. The 3D simulation computer 301 and the animation display computer 302 are connected by wired or wireless. The drivers can manipulate the driving wheel 303, the gas pedal 304, and/or the brake 305 to control the vehicle in the 3D driving simulator. Their data are then captured by the data interface 306, and forwarded to the 3D simulation computer 301.

Various driving scenarios can be designed at the 3D simulator such as follow to stop, emergency braking, cut-in, and so on so as to collect the driving data of skilled drivers, including a state variable x(t) and a control variable u(t). The state variable may include the relative distance and relative speed (Δd(t),Δv(t)). The control variable u(t) may be the acceleration of the host vehicle. The data and their historical data are used to train the critic unit 1021. During the offline learning process, the state variable x(t) can be derived from the software, the data interface 306 is used to receive the control signals for the gas pedal and the brake, and obtain the respective control variable u(t) (namely the acceleration) using the vehicular dynamics model. The control variable u(t) is applied on the host vehicle to calculate the system state variable x(t+1) at a next time based on the position and the speed of the target vehicle.

The 3D simulator may be a driver-in-the-loop adaptive cruise control simulation system, which will provides a safe and fast simulation environment and verification solution for developing the adaptive cruise control system. The hardware parts of the 3D simulator may include the driving wheel, the gas pedal, the brake, the data acquisition unit, the display and the computer, and so on. The software parts of the 3D simulator may include a 3D model of the vehicles, driving simulation scenarios with lanes, an embedded longitudinal vehicle dynamics model and adaptive cruise control algorithms. The driver can operate the hardware parts to take part in the simulation process, and the simulation results are computed by the software parts and displayed in the 3D scenarios. The driving simulation scenarios may include a cruise control without a target vehicle; the target vehicle starting to go or being accelerated; the target vehicle leaving a current lane; the target vehicle being decelerated or stopping; the target vehicle being decelerated in the emergency; other vehicles cutting-in from another lane.

The critic unit 1021 is designed using a simple three layered feed-forward neural network, to use an approximation property of nonlinear functions. The following definitions are made to illustrate each of layer functions: $f^k$ is an integrated function of the current node, to combine information including an activity or data from other nodes as the input of the current node, where a superscript k represents a layer number, and $a^k$ is an activity function of the current node, to output an activity value as the output of the current node. The function of each node is defined as follows.

Layer 1: is an input layer, for transferring the data to the next layer. The input $y_i(t)$ may include the state variable $x_i(t)$, i=1,2, ..., p, and the control variable u(t), y(t)=(x(t), u(t)), i=1,2, ..., q(q=p+1), where p represents the number of the state variables.

The integrated function of the node in Layer 1 is denoted by $$f_i^1 = y_i(t) \text{ and } a_i^1 = f_i^1$$

Layer 2: is a hidden layer, for weighting the input data. $w_{c_{i,j}}^2$ is a weight of the hidden neural layer, exp represents an exponential function, and j=1,2, ..., $N_h$, where $N_h$ is the number of neurons in the hidden layer.

The integrated function of the node in Layer 2 is denoted by $$f_j^2 = \sum_{i=1}^{q} w_{c_{i,j}}^2 a_i^1 \text{ and } a_j^2 = \frac{1 - \exp(-f_j^2)}{1 + \exp(-f_j^2)}$$

Layer 3: is an output layer. $w_{c_j}^3$ is a weight of neurons in the output layer. This layer outputs the value J(t) to approximate the control performance index R(t).

The integrated function of the node in Layer 3 is denoted by $$f^3 = \sum_{j=1}^{N_h} w_{c_j}^3 a_j^2 \text{ and } a^3 = J(t) = f^3$$

The critic unit 1021 is trained by adjusting the weights of the neurons in the hidden layer and the weights of the neurons in the output layer $w_{c_j}^3$, to decrease a learning error objective function $E_c(t)$ for the critic unit 1021 to a predefined threshold or the number of learning reaches a predetermined value, to exploit the approximation property.

The objective function $E_c(t)$ can be formulated with J(t), J(t−1) and the reward r(t).

$$e_c(t) = \gamma J(t) - J(t-1) + r(t)$$

$$E_c(t) = \frac{1}{2} e_c^2(t)$$

If $E_c(t)$ goes to zero, the output J(t) of the critic unit 1021 can be derived as $$J(t) = \sum_{k=t+1}^{\infty} \gamma^{k-t-1} r(k)$$

The above definition is the same as that of R(t) defined above. That is to say, the critic unit 1021 can evaluate the performance index R(t) accurately to guide the optimization of control unit 1022. The learning objective of the critic unit 1021 is to adjust the weights of the hidden and output layers respectively, shown as follows.

$$w_c^k = w_c^k + \Delta w_c^k$$

$$\Delta w_c^k = l_c^k(t) \left[ -\frac{\partial E_c(t)}{\partial w_c^k} \right]$$

-continued $$\frac{\partial E_c(t)}{\partial w_c^k} = -\left[\frac{\partial E_c(t)}{\partial J(t)}\frac{\partial J(t)}{\partial w_c^k}\right].$$

where $l_c^k(t)$ is a learning rate at the $k^{th}$ layer.

The learning process of the critic unit 1021 may minimize the objective function $E_c(t)$, to make the critic unit 1021 have a satisfied performance index. The objective function $E_c(t)$ can be set as a small value, e. g., from 0.000001 to 0.1. In addition, a fixed iteration number of learning process may be set as the predetermined value, e. g., from 10 to 1000000.

When the vehicle runs on a real road, the critic unit 1021 subjected to the offline learning process may receive the system state variable x(t) from the data acquisition unit 103 and the control variable u(t) from the control unit 1022, to derive the approximated performance index J(t). If J(t) satisfies a predetermined requirement, it indicates a control result of the control unit 1022 is good, otherwise, is the control unit 1022 should be trained by using the approximated performance index J(t) received.

The control unit 1022 is used to generate the control signal to control the acceleration of the host vehicle. The offline and online learning processes may be applied on the control unit 1022.

The state variable x(t) is inputted to the control unit 1022 to generate the control variable u(t). The construction of the control unit 1022 is similar to that of the critic unit 1021. A simple three layered feed-forward neural network may be used and the definition of the nodes in each layer is the same as that in the critic unit 1021.

The training objective of the control unit 1022 is to generate a proper control variable u(t) based on the state variable x(t), to maximize the performance index, that is, to maximize the output J(t) of the critic unit 1021. Therefore, the control unit 1022 is trained to minimize the objective function $E_a(t)$:

$$e_a(t) = J(t) - U_c(t)$$

$$E_a(t) = \frac{1}{2}e_a^2(t)$$

where $U_c(t)$ is a desired objective function. Typically $U_c(t)$ is set as a value which is closest to the approximated performance index J(t). If the minimum of the reward r(t) is zero, $U_c(t)$ can be simply set 0. By adjusting the weights of the hidden and output layers, the control unit 1022 is optimized to meet the requirement of the performance index.

The automatic cruise control unit 102 subjected to the offline learning process is tested by the drivers on the real vehicles. If the drivers are not satisfied, he/she may turn off the automatic cruise control unit, and switch to a manual operation. Meanwhile, the automatic cruise control unit is trained online directly to imitate his/her driving habit.

During the online learning process, the critic unit 1021 is trained first. When the critic unit 1021 satisfies the requirement, the control unit 1022 is trained online sequentially. Such a learning process for training the control unit 1022 with the evaluation of the critic unit 1021, can prevent an influence to the control unit 1022 from the unstable manipulation of the drivers. On the other hand, the manipulation of the driver can be used directly as a supervisor to train the control unit 1022, and the output of the control unit 1022 is compared to the manipulation data to calculate a learning error as follows:

$$e_a(t) = u_a(t) - u_d(t)$$

where $u_a(t)$ is the acceleration calculated by the control unit 1022, $u_d(t)$ is an actual acceleration by which the driver controls the vehicle. If the optimized output of the control unit 1022 is close to the acceleration of driver, it indicates that the online learning process may be completed. The actual acceleration u(t) for controlling the vehicle may be a weighted sum of the two accelerations mentioned above.

$$u_a(t) = wu_a(t) + (1-w)u_d(t)$$

where $0 \le w \le 1$ is a weight, which may increase as the progressing of the learning process until 1. The acceleration of the vehicle is determined by the output of the control unit 1022.

After the training process of the control unit 1022 is completed, the control unit 1022 can be used as a driver assistant to be selected by the driver. If the driver is still not satisfied with the automatic cruise control unit 102 during the driving scenarios, the driver can switch to the manual operation and repeat the online learning process of the control unit 1022 again.

The control unit 1022 designed with the artificial neural network is a scheme using the nonlinear control method, which is robust to changes of sensing data, such as the relative distance and the relative speed detected. The adaptive cruise controller according to the embodiment is the upper controller. Thus the robustness to the changes of ground friction coefficients and a payload may be solved by using the bottom controller, e. g., the inverse model of the vehicular dynamics.

The above critic unit 1021 and the control unit 1022 can also be implemented with a fuzzy system. The control unit 1022 may use a conventional PID control method to obtain different learning results. The data acquisition unit 103 is used to sense the relative distance from the host vehicle to the target one, the relative speed, and the speed of the host vehicle. These data are transmitted to the automatic cruise control unit 102. Data acquisition unit 103 may be at least one of a radar sensor, an ultrasonic sensor and a laser sensor.

The control variables for the brake control unit 105 and the gas pedal unit 106 are obtained by retrieving a lookup table or computation according to the acceleration outputted from the automatic cruise control unit 102 and the vehicular inverse dynamics model generating unit 104.

Figure 3:
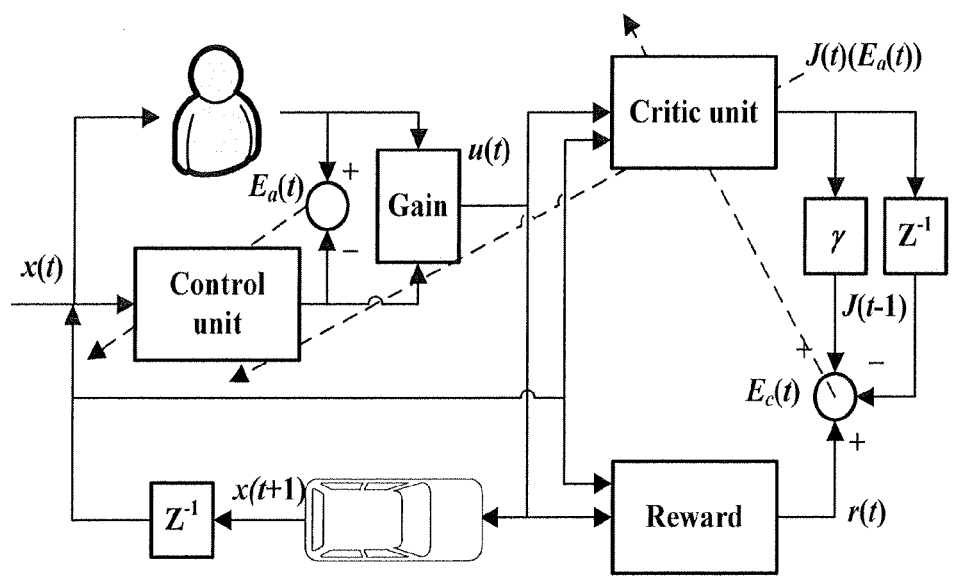
FIG. 3 shows a diagram of a vehicle adaptive cruise control system schematically according to the present invention.
Figure 4:
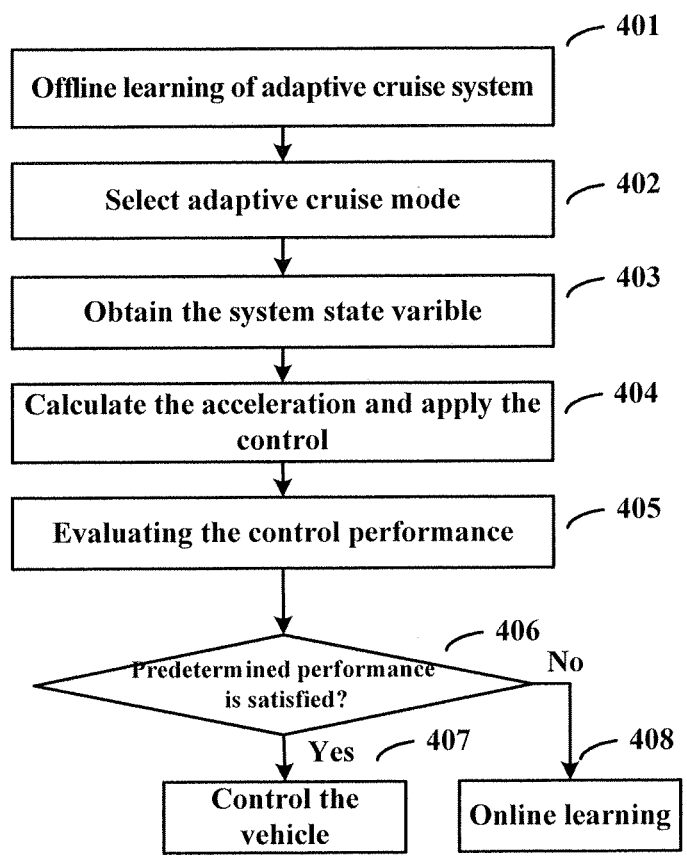
FIG. 4 shows a flowchart of a vehicle adaptive cruise control method according to the present invention.

In summary, the offline and online learning mechanism of adaptive cruise control according to the present invention is illuminated with reference to FIG. 3. The input to control unit 1022 is x(t) including the relative distance and the relative speed ($\Delta d(t), \Delta v(t)$), and the output of the automatic cruise control unit 102 is the control variable u(t) (the acceleration of the vehicle), which may be applied on the 3D simulator or the real vehicle to generate the system state variable x(t+1) at the next time. The control performance at each time can be represented by the reward r(t), and the performance index J(t) is derived from the critic unit 1021. If the driver is not satisfied with the control performance, the adaptive cruise control system may be turned off to switch to the manual control system. The manipulation of the driver and the output of the control unit 1022 are used to calculate the online learning error $E_a(t)$ and to generate the control variable u(t) by weighting. The offline learning error $E_a(t)$ of the control unit 1022 is simply represented by the performance index J(t), and the learning error $E_c(t)$ of the critic unit 1021 is established by using the above equation. In FIG. 3, a solid line represents the data flow, and a dashed line represents a direction of the learning process, and $Z^{-1}$ indicates a Z transform for transforming the current variable to a variable for a previous time.

The present invention also provides an adaptive cruise control method including steps of:

S401: training the vehicle adaptive cruise control offline on the 3D simulator. The process is depicted in detail above.

S402: selecting the preferred adaptive cruise mode.

The adaptive cruise mode may include the safety mode, the agility mode and the comfort mode represented by the different performance index respectively. The process is also depicted in detail above. Such modes can be set by the driver by using the button, the menu, the joy stick, the touch screen, or the remote controller.

S403: obtaining the system data of the vehicle.

According to the adaptive cruise control method, during the motion of the vehicle, the system state variable x(t) including the relative distance and the relative speed (Δd(t), Δv(t)) is detected by the radar sensor or laser sensor on the vehicle.

S404: calculating the control variable u(t) (the acceleration) based on the system state variable x(t). The acceleration is further used to control the speed of the vehicle by controlling the brake and/or the gas pedal based on the vehicular inverse dynamics model. The system state variable x(t+1) at the next time is then obtained.

S405: evaluating the control performance obtained in S404.

The performance index R(t) is defined as the sum of the instant reward r(t), $$R(t) = \sum_{k=t+1}^{\infty} \gamma^{k-t-1} r(k)$$

where r(t) is the instant reward at time t, γ is the discount factor, 0<γ≤1, and k is an variable to represent the range of time t.

The reward r(t) can be defined as a quadratic form as $$r(t) = -(x(t)^T Q x(t) + u(t)^T R u(t)) = -(\rho_d \Delta d(t)^2 + \rho_v \Delta v(t)^2 + \rho_a a(t)^2)$$

where $\rho_d$, $\rho_v$ and $\rho_a$ are the weights of relative distance, the relative speed and the acceleration respectively, which may be selected according to the different driving habits. The relative distance Δd(t)=d(t)−$d_d$(t) is defined as the difference between the actual distance d(t) and the desired distance $d_d$(t), the relative speed Δv(t)=$v^T$(t)−$v^H$(t) is defined as the difference between the speed of the target vehicle $v^T$(t) and the speed of the host vehicle $v^H$(t).

The approximated performance index J(t) may be calculated from critic unit 1021 to replace the performance index R(t).

S406: If the control performance complies with the requirement, then executing S403 to continue the adaptive cruise control method, otherwise executing S407 to train the critic unit 1021 and the control unit 1022 online.

The control performance can be represented with J(t). If J(t) falls into a given range, it indicates the adaptive cruise control performance is good enough to be continued. Otherwise, the critic unit 1021 and the control unit 1022 should be trained online.

In the present invention, J(t) is used to determine the control performance. If the driver is not satisfied with the control performance, even if J(t) is within a given range, the adaptive cruise control system may be turned off to switch to the manual control simply by stamping the gas or the brake pedal. Then the adaptive cruise control is under the control of the online training process.

In the present invention, the online learning process is applied on the adaptive cruise control method and the offline learning is applied to train the critic unit and the control unit.

The offline learning and online learning processes are also depicted in detail above.

While the preferred embodiments of the present invention have been described above, it should be noted that various modifications and improvements can be made by those skilled in the art without departing from the principle of the present invention. These modifications and improvements are to be encompassed by the scope of the present invention.

What is claimed is:

1. An adaptive cruise control system, comprising:
   an adaptive cruise mode selection circuit configured to select adaptive cruise modes to control speeds and relative distances for a host vehicle in different modes;
   at least one data acquisition sensor configured to acquire vehicle state information x(t), the vehicle state information x(t) including information indicative of a relative distance and of a relative speed;
   a control circuit configured to generate a vehicle control signal u(t) based on the vehicle state information x(t);
   a critic circuit configured to evaluate a control performance according to the vehicle state information x(t) and the vehicle control signal u(t) to drive the host vehicle; and
   a gas pedal and a brake, which, in operation, are controlled respectively by using the vehicle control signal u(t) output from the control circuit and a vehicle pedal and brake control inverse dynamics model, wherein:
   an output of the critic circuit is an approximate performance index for determining whether the control performance complies with a determined performance requirement, if the control performance complies with the determined performance requirement, the critic circuit is configured to continue to execute evaluation based on the vehicle control signal;
   if the control performance does not comply with the determined performance requirement, the control circuit and the critic circuit execute respective online training processes;
   the adaptive cruise control system is turned off to switch to a manual control mode in response to manual activation of the gas pedal or the brake so as to execute the online training processes of the control circuit and the critic circuit;
   the online training process of the critic circuit is designed using a three layered feed-forward neural network so as to decrease a learning error objective function to a predefined threshold or a number of performing the online training process reaches a predetermined value;
   the approximate performance index J(t) is defined as $$J(t) = \sum_{k=t+1}^{\infty} \gamma^{k-t-1} r(k)$$

where γ is a discount factor, 0<γ≤1, r(t) is an instant reward at time t and defined as a quadratic form, $$r(t) = -(x(t)^T Q x(t) + u(t)^T R u(t)) = -(\rho_d \Delta d(t)^2 + \rho_v \Delta v(t)^2 + \rho_a a(t)^2)$$

where $\rho_d$, $\rho_v$ and $\rho_a$ are weights of the relative distance, the relative speed and an acceleration of the host vehicle respectively, Q and R are adjusting parameters, T represents a transpose operation, the relative distance Δd(t) is defined as a difference between an actual distance and a desired distance, the relative speed $\Delta v(t)$ is defined as a difference between a speed of the target vehicle and a speed of the host vehicle, and $\alpha(t)$ is the acceleration of the host vehicle;

wherein a learning error for the online training process of the critic circuit is defined as $$E_c(t) = \frac{1}{2}e_c^2(t),$$

where $e_c(t)=\gamma J(t)-J(t-1)+r(t)$, a learning error for the online training process of the control circuit is defined as $$E_a(t) = \frac{1}{2}e_a^2(t),$$

where $e_a(t)=J(t)-U_c(t)$, and $U_c(t)$ is set as a value closest to the approximated performance index.

2. The system according to claim 1, wherein the adaptive cruise modes comprise a safety mode, an agility mode and a comfort mode.

3. The system according to claim 2, wherein the adaptive cruise mode selection circuit comprises at least one of a button, a menu, a joystick, a touch screen and a remote controller.

4. The system according to claim 3, wherein the vehicle control signal u(t) generated by the control circuit includes the acceleration of the host vehicle.

5. The system according to claim 1, wherein the critic circuit and the control circuit are configured to execute offline training processes which correspond to respective online training processes on a 3D simulator before driving the host vehicle.

6. An adaptive cruise control method executed by an adaptive cruise control system, the method comprising steps of:
  selecting an adaptive cruise mode to control speeds and relative distances for a host vehicle;
  acquiring vehicle state information x(t), as an input to a control circuit, the vehicle state information including a relative distance and a relative speed;
  generating, by the control circuit, a vehicle control signal u(t) based on the vehicle state information x(t);
  evaluating, by a critic circuit, a control performance according to the vehicle state information x(t) and the vehicle control signal u(t) to drive the host vehicle;
  if the results of evaluation indicates that the control performance complies with a determined performance requirement, controlling a gas pedal and a brake respectively of the host vehicle by using the vehicle control signal u(t) and a vehicle pedal and brake control inverse dynamics model, wherein
  the step of evaluating outputs an approximate performance index for determining whether the control performance complies with the determined performance requirement;
  if the control performance complies with the determined performance requirement, executing control based on the vehicle control signal;
  if the control performance does not comply with the determined performance requirement, executing online training process of the critic circuit and the control circuit; and turning off the adaptive cruise control system to switch to a manual control mode in response to manual activation of the gas pedal or the brake so as to execute the online training process of the control circuit;

the online training process of the critic circuit is designed using a simple three layered feed-forward neural network so as to decrease a learning error objective function for the critic unit to a predefined threshold or a number of performing the online training process reaches a predetermined value;

the approximate performance index J(t) is defined as $$J(t) = \sum_{k=t+1}^{\infty} \gamma^{k-t-1} r(k)$$

where $\gamma$ is a discount factor, $0<\gamma\leq 1$, r(t) is an instant reward at time t and defined as a quadratic form, $$r(t)=-(x(t)^T Q x(t)+u(t)^T R u(t))=-(\rho_d \Delta d(t)^2+\rho_v \Delta v(t)^2+\rho_a a(t)^2)$$

where $\rho_d$, $\rho_v$ and $\rho_a$ are weights of the relative distance, the relative speed and an acceleration of the host vehicle respectively, Q and R are adjusting parameters, T represents a transpose operation, the relative distance $\Delta d(t)$ is defined as a difference between an actual distance and a desired distance, the relative speed $\Delta v(t)$ is defined as a difference between a speed of the target vehicle and a speed of the host vehicle, and $\alpha(t)$ is the acceleration of the host vehicle;

a learning error for the online training process of the critic circuit is defined as $$E_c(t) = \frac{1}{2}e_c^2(t),$$

where $e_c(t)=\gamma J(t)-J(t-1)+r(t)$, a learning error for the online training process of the control circuit is defined as $$E_a(t) = \frac{1}{2}e_a^2(t),$$

where $e_a(t)=J(t)-U_c(t)$, and $U_c(t)$ is set as a value closest to the approximated performance index.

7. The method according to claim 6, wherein the adaptive cruise modes comprise a safety mode, an agility mode and a comfort mode.

8. The method according to claim 7, wherein the adaptive cruise mode is selected with at least one of a button, a menu, a joystick, a touch screen and a remote controller.

9. The method according to claim 6 wherein the vehicle control signal u(t) generated by the control unit includes the acceleration of the host vehicle.

10. The method according to claim 6, further comprising steps of executing offline training processes which correspond to respective online training processes on a 3D simulator before driving the host vehicle.

* * * * *